US012665202B2

(12) United States Patent   (10) Patent No.:  US 12,665,202 B2
Keller et al.   (45) Date of Patent:  Jun. 23, 2026

(54) METHOD FOR PRODUCING A GREEN PAPER FOR PRODUCING A GAS DIFFUSION LAYER FOR A FUEL CELL

(71) Applicant: GIESECKE+DEVRIENT CURRENCY TECHNOLOGY GMBH, Munich (DE)

(72) Inventors: Mario Keller, Seebruck (DE); Alexander Tantscher, Dresden (DE); Karlheinz Mayer, Grunenbach (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 678 days.

(21) Appl. No.: 18/025,007

(22) PCT Filed: Aug. 31, 2021

(86) PCT No.: PCT/EP2021/025329
§ 371 (c)(1),
(2) Date: Mar. 7, 2023

(87) PCT Pub. No.: WO2022/048796
PCT Pub. Date: Mar. 10, 2022

(65) Prior Publication Data
US 2023/0411632 A1      Dec. 21, 2023

(30) Foreign Application Priority Data
Sep. 7, 2020    (DE) .................... 10 2020 005 477.3

(51) Int. Cl.
| | |
|---|---|
| *H01M 4/88* | (2006.01) |
| *D21F 11/08* | (2006.01) |
| *D21H 17/67* | (2006.01) |
| *D21H 19/82* | (2006.01) |
| *D21H 23/50* | (2006.01) |
| *D21H 23/52* | (2006.01) |
| *D21H 27/02* | (2006.01) |
| *D21H 27/38* | (2006.01) |
| *D21H 27/40* | (2006.01) |
| *H01M 4/92* | (2006.01) |
| *H01M 8/0232* | (2016.01) |
| *H01M 8/0239* | (2016.01) |
| *H01M 8/0243* | (2016.01) |
| *H01M 8/0245* | (2016.01) |
| *H01M 8/0258* | (2016.01) |
| *H01M 8/10* | (2016.01) |
| *H01M 8/1004* | (2016.01) |

(52) U.S. Cl.
CPC .......... *H01M 4/8807* (2013.01); *D21F 11/08* (2013.01); *D21H 17/67* (2013.01); *D21H 19/82* (2013.01); *D21H 23/50* (2013.01); *D21H 23/52* (2013.01); *D21H 27/02* (2013.01); *D21H 27/38* (2013.01); *D21H 27/40* (2013.01); *H01M 4/925* (2013.01);

*H01M 8/0232* (2013.01); *H01M 8/0239* (2013.01); *H01M 8/0243* (2013.01); *H01M 8/0245* (2013.01); *H01M 8/0258* (2013.01); *H01M 8/1004* (2013.01); *H01M 2008/1095* (2013.01)

(58) Field of Classification Search
CPC ..... H01M 4/8807; D01G 9/009; D21H 23/50; D21H 19/82; D21H 17/67; D21F 11/18
See application file for complete search history.

(56) References Cited

U.S. PATENT DOCUMENTS

| | | |
|---|---|---|
| 5,300,165 A | 4/1994 | Sugikawa |
| 8,333,870 B2 | 12/2012 | Burchard et al. |
| 8,524,039 B2 | 9/2013 | Kaule et al. |
| 2004/0249754 A1 | 12/2004 | Kaule et al. |
| 2006/0127649 A1 | 6/2006 | Keller et al. |
| 2007/0238010 A1 | 10/2007 | Zhang et al. |
| 2009/0001709 A1 | 1/2009 | Kretschmar et al. |
| 2010/0255407 A1 | 10/2010 | Kim et al. |
| 2012/0273410 A1 | 11/2012 | Hofenauer et al. |
| 2018/0294487 A1 | 10/2018 | Horinouchi et al. |

(Continued)

FOREIGN PATENT DOCUMENTS

| | | |
|---|---|---|
| CN | 106299398 A | 1/2017 |
| CN | 110485191 A | 11/2019 |

(Continued)

OTHER PUBLICATIONS

English translation of Kretschmar et al (WO2006099971) obtained via Google Patents on Nov. 20, 2025 (Year: 2025).*
English translation of Ketzer et al (WO 2020120154) obtained via Google Patents on Nov. 20, 2025 (Year: 2025).*
Chinese Office Action from Corresponding Chinese Patent Application No. CN202180055165.7, Jan. 23, 2024.
Japanese Office Action from Corresponding Japanese Patent Application No. JP2023-514854, Jan. 27, 2025.

(Continued)

*Primary Examiner* — Sarah A. Slifka
(74) *Attorney, Agent, or Firm* — Workman Nydegger

(57) ABSTRACT

A method is provided for producing a green paper for producing a gas diffusion layer (GDL) for a fuel cell. A use is described of an accordingly produced gas diffusion layer (GDL) in a fuel cell. A first paper web is loaded with metal powder and/or metal fibers, and a microporous layer (MPL) is in the form of at least one coating is applied onto the paper web. The paper web is then subjected to a binder removal process, a sintering process, a coating process, atomic layer deposition (ALD) using thermal ALD methods, and optionally additional process steps in order to obtain the final GDL. After the sintering process, all of the organic components of the green paper are pyrolyzed and thus no longer contained in the GDL, and the GDL consists virtually exclusively of a metal framework.

18 Claims, No Drawings

(56)  References Cited

U.S. PATENT DOCUMENTS

| | | |
|---|---|---|
| 2019/0027761 A1 | 1/2019 | Miyake et al. |
| 2019/0245214 A1 | 8/2019 | Yoon et al. |
| 2022/0123327 A1 | 4/2022 | Ketzer et al. |

FOREIGN PATENT DOCUMENTS

| | | | |
|---|---|---|---|
| CN | 111540921 | A | 8/2020 |
| DE | 68925580 | T2 | 9/1996 |
| DE | 10243653 | A9 | 11/2006 |
| DE | 102008042415 | B3 | 5/2010 |
| EP | 1432868 | A1 | 6/2004 |
| JP | 2006339089 | A | 12/2006 |
| JP | 2013191435 | A | 9/2013 |
| JP | 2015195111 | A | 11/2015 |
| KR | 20200043647 | A | 4/2020 |
| WO | 2006099971 | A2 | 9/2006 |
| WO | 2014040706 | A1 | 3/2014 |
| WO | 2017006907 | A1 | 1/2017 |
| WO | 2020120154 | A1 | 6/2020 |

OTHER PUBLICATIONS

International Search Report from PCT Application No. PCT/EP2021/025329, Dec. 13, 2021.

Search Report from German Application No. 10 2020 005 477.3, May 6, 2021.

\* cited by examiner

METHOD FOR PRODUCING A GREEN PAPER FOR PRODUCING A GAS DIFFUSION LAYER FOR A FUEL CELL

BACKGROUND

The invention relates to a process for producing a green paper for production of a gas diffusion layer (GDL) for a fuel cell. The invention further relates to use of a correspondingly produced gas diffusion layer (GDL) in a fuel cell.

In a fuel cell of the proton exchange membrane fuel cell (PEMFC) type, also referred to as polymer electrolyte fuel cell, gas distribution to the membrane coated with catalytic platinum (also referred to as CL or catalyst layer) is achieved by means of what is called a bipolar plate (BPP) and the gas diffusion layer (GDL). The entire construction between two bipolar plates is also referred to as membrane-electrode assembly (MEA).

Under catalytic oxidation of hydrogen and oxygen, the fuel cell produces electrical power, water vapor and heat.

For the automotive sector, a GDL that has now become established is one which is produced from a fiber material, for example carbon fibers, and a coated BPP made of steel. The fiber material may take the form of a textile weave/knit or of a fiber mat produced by paper methodology, as known, for example, from DE 10 2008 042 415 B3. It may also consist of two plies: a fine ply that adjoins the CL, and a coarser ply that adjoins the BPP and the flow field.

The fiber mat produced by paper methodology is referred to as green paper or sintered paper, which is debindered and/or sintered in one of the subsequent operating steps and hence processed further to give a GDL.

A particular drawback in the production of GDLs based on carbon fibers is that carbon fibers and the further processing thereof are associated with relatively high costs. Furthermore, carbon fibers are pressure-sensitive, which can lead to breakage of fibers, which may then possibly damage the CL/PEM. In addition, the carbon fibers can bulge or swell up and penetrate into the channels of the BPP, which reduces the flow of gas and water and worsens the efficiency of the fuel cell. Moreover, the porosity of the GDL is adjustable only to a limited degree, and, in the case of a two-layer GDL with a combination of coarse and fine porosity, at least two additional operating steps are needed.

SUMMARY

Finally, the flow field has to be formed completely by the BPP, because a GDL known from the prior art does not have any means of structuring. For this purpose, the BPP has to be embossed, or the green paper has to be processed, in order to achieve a gas distribution structure or structuring for the flow field. This is generally a separate, complex operation.

It is therefore an object of the invention to develop a generic process for producing a green paper for production of a gas diffusion layer (GDL) for a fuel cell so as to remedy the drawbacks of the prior art.

DETAILED DESCRIPTION OF VARIOUS EMBODIMENTS

According to the invention, a first paper web is produced, preferably with added metal powder and/or metal fibers, and a microporous layer (MPL) in the form of at least one coating is applied to the paper web. This paper web is then processed to give the ultimate GDL by debindering, sintering, coating, atomic layer deposition (ALD) by means of the thermal ALD method, and optionally further process steps.

After the sintering, all organic constituents of the green paper have been pyrolyzed and hence are no longer present in the GDL; the GDL consists virtually exclusively of a metal framework. It currently appears that the porosity of the metal framework is dependent especially on the fiber density of the paper webs, the (grain) size of the metal powders and/or metal fibers, and added additives.

In a preferred embodiment, the coating is applied to the paper web by a paper coating method known from the prior art, screenprinting method or plasma coating.

If the coating is applied to the paper web before the green paper has been sintered, the coating preferably includes powders/fibers having a grain size/fiber diameter of preferably 0.4 µm to 5 µm, present in an organic binder matrix in the paper coating method or screenprinting method. After the sintering, resultant pore sizes in the GDL or MPL are in the order of magnitude of 0.1 µm to 3 µm.

If the coating is applied to the paper web after the green paper has been sintered, the coating preferably has a composition known from the prior art, known, for example, from DE 10 2008 042 415 B3.

The applicator used for the coating of the paper may either be a LTDA (LongTimeDwellApplicator) roll applicator or STDA (ShortTimeDwellApplicator) nozzle applicator. The application is followed by leveling by a suitable squeegee method (roll squeegee/bent/stiff blade, airblade). In order to achieve texturing of the coat relative to the surface, the coat can be applied by means of a curtain coater or film press (size press, gravure coater). While blade coats can achieve applications of up to 30 g/m$^2$, film presses can achieve coatweights up to 7 g/m$^2$.

If the coating is applied to the paper web by screenprinting prior to sintering, screenprinting is preferably conducted with a cylindrical screen on a roll-to-roll machine or a laminating system. If the coating is applied to the paper web by screenprinting after sintering, screenprinting is preferably conducted in a sheet-fed machine; particular preference is given here to using a cylinder machine, for example a NotaScreen, or flat screen machine. Particular preference is given here to conducting screenprinting together with further methods in a printing machine, for example together with stamping and any additional embossing of the GDL.

If the coating is conducted by plasma coating, preference is given to supplying a plasma head with a metal powder and spraying it onto a paper web. By virtue of the plasma energy, the metal grains "cake" together. The grain size of the metal powder should be chosen so as to result in the desired pore size. A very fine-grain powder having a grain size of 0.4 µm to 5 µm results in a pore size in the order of magnitude of 0.1 µm to 3 µm. The plasma coating may be conducted before or after the sintering. After the sintering preferably in a sheet-fed method.

For the plasma coating, particular preference is given to using an atmospheric hot plasma that melts the metal particles/grains, such that they are bonded to the paper fibers, or the substrate. For MPL, it should be ensured that the melting process relates solely to the surface of the metal particles, in order that the shape thereof is essentially maintained and the desired pore structure is thus formed.

In a preferred embodiment, a watermark is made in at least one paper web. It has been found that, surprisingly, a green paper produced by papermaking can be structured by making a watermark in a paper web of the green paper in such a way that there is no need for, or at least simplification of, complex embossing of the BPP or post-processing of the green paper or of the GDL produced from the green paper.

The later flow field is integrated here into the green paper without a separate operation, in that a corresponding watermark is integrated into the watermark ply in the cylindrical screen of a paper machine. It is possible here, without any particular complexity, by virtue of the design-dependent structuring of the watermark screen, with the associated modulation of paper thickness, to achieve a desired shape and gradation of the flow field channels. In order to increase the resolution of the structuring, it is also possible to use a high-resolution or multistage watermark, as known, for example, from EP 1432868 A1 or WO 2014/040706 A1.

A watermark in the context of this invention is a true watermark, where the thickness of the paper varies, but the density of the paper does not vary. The paper here has regions having a greater and/or lower thickness compared to the adjacent regions, although the density of the paper is the same in all regions. Such a watermark may be introduced into the paper web either in the course of papermaking, in that, for example, depressions or elevations are included in a cylindrical screen, at which there is greater or lesser accumulation of paper fibers in the creation of the paper from the pulp. However, it can also be introduced into the paper web subsequently, in that parts of the paper are removed, for example mechanically by machining or by lasering.

Alternatively, an artificial watermark is also possible, where the still-wet paper web is embossed by an embossing operation after the paper web has been removed, for example, from the cylindrical screen. Such a watermark is also referred to as a dandy roller watermark. The embossing reduces the thickness of the paper, although the density of the paper is simultaneously increased. The paper fibers are thus densified or compressed. This densification has the advantage that it prevents too much gas from diffusing directly through the GDL in the forward region of the channel toward the catalyst layer (CL), and hence ensures more uniform gas distribution.

More preferably, a true watermark and an artificial watermark may be combined with one another, in that, for example, parts of a watermark are formed by a true watermark and other parts by an artificial watermark.

In a further preferred embodiment, the green paper consists of a first paper web and at least a second paper web. The green paper here is formed from the first paper web and at least a second paper web. The second paper web is combined with and firmly bonded to the first paper web in the still-moist state. It is also possible here for the second and/or any further paper web to have a watermark.

The first and/or at least one second paper web may be produced here in a cylinder paper machine. Alternatively, the first and/or at least one second paper web may also be produced in a short former in which the paper stock is jetted onto a cylindrical screen. These production processes are known from WO 2006/099971 A2 for the production of security documents or documents of value, such as banknotes or ID cards, and are also methods that are preferred in accordance with the invention for production of a GDL from at least one paper web.

For instance, the green paper having a high level of metal powder and/or metal fiber filler is formed in one operation, and this is processed according to DE 10 2008 042 415 B3 with at least two different formulations to give a combined green paper having different properties. For the fuel cell, these are, for example, a thin ply having fine pores and a thicker ply having coarser pores. Porosity may also vary between two paper webs.

In addition, it is particularly advantageous when the green paper consists of two paper webs, each having a watermark, where the structures of the watermark of the first paper web and of the watermark of the second paper web are not identical, but have exact mirror symmetry in the plane and in the direction of material thickness. In other words, the structures of the watermark of the first paper web are phase-shifted by 180° relative to the structures of the watermark of the second paper web. This means that, when the first paper web and the second paper web are joined on their sides structured by the watermark, the elevations of the first paper web will coincide with the depressions of the second paper web. This embodiment has the particular advantage that the first and second paper webs may have different porosity after sintering. For example, the first paper web facing the membrane has a lower porosity of 20% to 75% after sintering, and the second paper web has a higher porosity of 30% to 90% after sintering, such that the second paper web barely acts as a barrier to the gas, but acts merely as a spacer to the bipolar plate. In this way, optimal gas distribution may be combined with optimal stackability and optimally uniform distribution of the mechanical pressure over the entire PEM membrane. Particularly advantageously, between the first paper web and the membrane, there is a microporous layer (MPL) having a fine surface with low roughness and smaller pores than the first and second paper webs.

In a preferred embodiment, the first paper web has a higher density than the second paper web. The first paper web has, for example, a density of 3 $g/cm^3$ to 10 $g/cm^3$, the second a density of 1 $g/cm^3$ to 5 $g/cm^3$. More preferably, the first paper web is formed here by a finer paper fiber slurry than the second paper web, which correspondingly leads to finer pores in this subregion of the sinter paper.

The thickness of the first paper web is preferably 5 μm to 50 μm, more preferably 10 μm to 20 μm, and that of the second paper web is preferably 50 μm to 400 μm, more preferably 80 μm to 200 μm.

In a further preferred embodiment, the watermark is configured as a depression in the form of at least one channel, where the channel serves for passage of gas, i.e. the fuel or the oxygen. This channel preferably meanders over the area of the paper web. An alternative possibility is multiple channels in the form of a grid or in the form of rays with circular segment-like connecting channels.

It is also possible for one or more of the paper plies to accommodate additional channels for water transport by one of the methods described above. These ensure balanced water transport and have the particular advantage that the PEM cell is neither flooded nor dries out, since both have an adverse effect on the efficiency of the cell. In addition, water channels may also be used for sustained cooling of the cell.

In a further preferred embodiment, structuring by lasers is incorporated into the surface of the green paper or of the sintered green paper in addition to the watermark. This has the advantage that a laser beam can be used to introduce, for example, deeper structures or structures with steeper flanks, or that existing structures can be deepened or provided with steeper flanks. In addition, lasering can also be effected in one or more former plies in order to introduce structuring or channels into the interlayer between watermark and former ply, and hence to further improve gas distribution.

In a further preferred embodiment, the gases in the middle of the bipolar plates (based on the top view of the bipolar plates) are coupled into the GDL and then distributed outward via various watermark structures and/or channels in the GDL, or toward the outer edge of the GDL. The watermark structures and/or channels may, for example, lead outward in the manner of rays or in the manner of a spiral proceeding from the middle of the GDL, and these may be supplemented by annular watermark structures and/or channels in a concentric arrangement.

The GDL typically has an area of 300 $cm^2$ to 350 $cm^2$ and has a thickness between 100 μm and 300 μm depending on the system and function. If the function of the flow field is integrated into the GDL, the thickness of the GDL may also be greater. The depth of the channels is up to 350 μm. Since the GDL must also have a certain compressibility and simultaneously conduct the current between the individual cells, the GDL with a former ply and cylindrical screen ply has a thickness of 100 μm to 400 μm, and the BPP should take the form of a smooth sheet having a thickness of 75 μm or less. Since the BPP typically also assumes a cooling function for the fuel cell, the BPP may then also take the form of a composite sandwich having a porous or channel-like passage for coolant. Alternatively, the cooling channels may also be integrated into the GDL or MEA.

In a further preferred embodiment, the BPP has a simplified flow field structure, and a partial flow field is additionally produced in the GDL. The former ply here is thin in order not to take up too much space.

The cell pitch is preferably 0.8 mm to 1 mm, since about 400 cells are stacked one on top of another for a 120 kW fuel cell in an automobile application. The fine former ply preferably has a thickness between 5 μm and 50 μm. The former ply preferably has a proportion of 2% to 40% in the overall GDL.

In a further preferred embodiment, with the aid of high-resolution or multistage watermark, passer marks, positioning aids, centering aids and ports for passages are produced. This advantageously simplifies the further processing of the GDL to give the fuel cell stack, since exact positioning of the GDL relative to the other components, such as BPP or CL, is possible, for example, with the aid of transmitted-light/incident-light image processing systems.

In a further preferred embodiment, the structures of the GDL on the anode side and on the cathode side are not identical, but are exactly mirror-symmetric in the plane and in the direction of material thickness. In other words, the structures of the GDL on the anode side are phase-shifted by 180° relative to the structures of the GDL on the cathode side. This means that, when an anode GDL is placed by the flow field side onto the flow field side of a cathode GDL, the elevations of one GDL coincide exactly with the depressions of the other GDL. The combination of two 3D minor-symmetric anode/cathode GDLs, superimposed one on top of another, thus results in an exactly planar piece of green paper. This embodiment has the advantage that the green paper can be densified with any mechanical pressure without losing its channel structure. This is because elevations and depressions of the green paper that are produced by the watermark and form flow field channels are not damaged, collapsed or leveled by later pressing and other mechanical stresses, such that the channels can remain effective. This embodiment also has the further advantage that the anode GDL and the cathode GDL can have different porosity. As an alternative to the alternating structure of anode GDL and cathode GDL, it is also possible for every second anode/cathode pair in the stack or every second stack to be equipped with 3D minor-symmetric GDLs.

The fuel cell is more preferably a proton exchange membrane fuel cell (PEMFC). In a preferred embodiment, the first paper web here forms a diffusion layer for a membrane (CL) coated with catalytic metal, preferably platinum, in the gas diffusion layer produced from the green paper, and the second paper web forms a distribution layer with a flow field in the gas diffusion layer produced from the green paper. The GDL produced from a green paper of the invention may, however, also be used for other kinds of fuel cell that require a porous conductive layer for gas distribution, for example a proton exchange membrane electrolyzer cell (PEMEC), electrolyzer cells or another power-to-X technology.

The paper web consists, inter alia, preferably of paper made from cellulose fibers or made from cotton fibers, as used, for example, for banknotes, or from other natural fibers or from synthetic fibers or from a mixture of natural and synthetic fibers. Also preferably, the paper web consists of a combination of at least two different substrates arranged one on top of another and bonded to one another, called a hybrid. Details of the weight of the paper web used are given, for example, in document DE 102 43 653 A9, the details of which in this regard are fully incorporated into this application. The metal-filled green paper may have a gram weight of 100 $g/m^2$ to 1200 $g/m^2$.

Filler materials used for the sinter paper may be any microscale metal powders and metal fibers, for example titanium, copper, zinc or rust-free stainless steels, as known from DE 10 2008 042 415 B3. What is important here is that different mixtures are used for the former ply and the cylindrical screen ply, in order to achieve a different porosity of the paper plies. The former ply here should be made finer than the cylindrical screen ply. It is also possible to use nanosize powders in the former ply.

In order to protect the metals from corrosion down to the smallest pores, and to produce the usually desirable hydrophobic properties preferentially on the side facing the catalyst, in a further preferred embodiment, a (thermal) ALD coating or other coating methods is/are used in one of the subsequent process steps. Preferably after the debindering and sintering and before the punching and finishing of the GDL, if the cuts are outside the region at risk of corrosion, or the cuts are sealed specially in the further process steps to give the finished cell. Otherwise, it is also possible to coat the GDL after the stamping and finishing by ALD, etc.

It will be apparent that the aforementioned features are usable not just in the combinations specified, but also in other combinations, without leaving the scope of the present invention, provided that it is covered by the scope of protection of the claims.

The invention claimed is:

1. A process for producing a green paper for production of a gas diffusion layer (GDL) for a fuel cell,
    wherein a first paper web is produced, with added metal powder and/or metal fibers, and a microporous layer (MPL) in the form of at least one coating is applied to the first paper web,
    wherein a watermark is made in the first paper web such that the watermark defines one or more flow field channels.

2. The process according to claim 1, wherein the at least one coating is applied to the paper web by a paper coating method, a screenprinting method or plasma coating.

3. The process according to claim 2, wherein the at least one coating is applied to the paper web prior to sintering of the green paper and includes a powder having a grain size of 0.4 μm to 5 μm, with the powder present in an organic binder matrix in paper coating methods or screenprinting methods.

4. The process according to claim 2, wherein the coating is applied to the paper web after the green paper has been sintered.

5. The process according to claim 1, wherein the coating takes the form of multiple plies, where the different plies have different grain sizes and/or different layer thicknesses and/or are applied partially and/or in a structured manner on the side of the green paper facing a catalyst layer (CL) or a bipolar plate (BPP) in the fuel cell.

6. The process according to claim 1, wherein the application of the coating is preceded by formation of at least one further paper web, which is combined with and bonded to the first paper web in a still-moist state.

7. The process according to claim 6, wherein the first paper web and/or each further paper web is produced in a cylinder paper machine and/or in a short former in which the paper stock is jetted onto a cylindrical screen.

8. The process according to claim 6, wherein the application of the coating is preceded by formation of a second paper web, wherein the first paper web has a higher density than the second paper web, where the first paper web has a density of 3 g/cm$^3$ to 10 g/cm$^3$ and the second paper web a density of 1 g/cm$^3$ to 5 g/cm$^3$.

9. The process according to claim 8, wherein the first paper web is formed by a finer paper fiber slurry than the second paper web.

10. The process according to claim 6, wherein the application of the coating is preceded by formation of a second paper web, wherein the first paper web in the gas diffusion layer (GDL) produced from the green paper forms a diffusion layer for a membrane (CL) coated with catalytic metal, including platinum, and the second paper web forms a distribution layer with a flow field in the gas diffusion layer (GDL) produced from the green paper.

11. The process according to claim 1, wherein the watermark is a true watermark where the thickness of the paper varies, but the density of the paper does not vary, and/or in that the watermark is an artificial watermark where the thickness of the paper is reduced, but the density of the paper is simultaneously increased.

12. The process according to claim 1, wherein the application of the coating is preceded by formation of a second paper web, which is combined with and bonded to the first paper web in a still moist state, wherein the first paper web and a second paper web each have a watermark comprising watermark structures, where the watermark structures of the first paper web and of the second paper web are not identical, but have exact mirror symmetry in the plane and in the direction of material thickness.

13. The process according to claim 1, wherein the green paper has a gram weight of 100 g/m$^2$ to 1200 g/m$^2$.

14. The process according to claim 1, wherein the metal powders and/or metal fibers comprise titanium, copper, zinc, and/or rust-free stainless steels.

15. A gas diffusion layer (GDL) that has been produced from a green paper according to claim 1, wherein the gas diffusion layer is configured for use in a proton exchange membrane fuel cell (PEMFC), in a proton exchange membrane electrolyzer cell (PEMEC), in electrolyzer cells or any other power-to-X technology that requires correspondingly porous conductive material for gas/power/reactant distribution.

16. A process for producing a green paper for production of a gas diffusion layer (GDL) for a fuel cell, wherein a paper web is produced, with added metal powder and/or metal fibers, and a microporous layer (MPL) in the form of at least one coating is applied to the paper web, wherein a watermark is made in the paper web such that the watermark defines one or more flow field channels, and wherein the paper web comprises of paper made from cellulose fibers.

17. The process according to claim 16, wherein the paper web further comprises cotton fibers.

18. The process according to claim 16, wherein the metal powders and/or metal fibers comprise titanium, copper, zinc, and/or rust-free stainless steels.

* * * * *